(12) United States Patent
Chen et al.

(10) Patent No.: US 12,130,519 B1
(45) Date of Patent: Oct. 29, 2024

(54) BACKLIGHT ASSEMBLY AND DISPLAY DEVICE

(71) Applicant: HON HAI PRECISION INDUSTRY CO., LTD., New Taipei (TW)

(72) Inventors: Chih-Hsien Chen, New Taipei (TW); Chia-Huang Chang, New Taipei (TW); Ming-Chih Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/532,860

(22) Filed: Dec. 7, 2023

(30) Foreign Application Priority Data

Sep. 26, 2023 (CN) .......................... 202322629516.X

(51) Int. Cl.
*G02F 1/13357* (2006.01)

(52) U.S. Cl.
CPC .. *G02F 1/133608* (2013.01); *G02F 1/133605* (2013.01); *G02F 1/133606* (2013.01)

(58) Field of Classification Search
CPC ......... G02F 1/133606; G02F 1/133608; G02F 1/133605
See application file for complete search history.

(56) References Cited

U.S. PATENT DOCUMENTS

| | | | |
|---|---|---|---|
| 2013/0194529 A1* | 8/2013 | Chang | G02F 1/133608 |
| | | | 362/97.1 |
| 2023/0039599 A1* | 2/2023 | Chiu | G02B 6/0066 |
| 2023/0205006 A1* | 6/2023 | Yang | G02F 1/133606 |
| | | | 349/62 |

* cited by examiner

*Primary Examiner* — Karabi Guharay
(74) *Attorney, Agent, or Firm* — ScienBiziP, P.C.

(57) ABSTRACT

A backlight assembly is provided, comprising a backboard, one or more light sources, a diffuser plate, and one or more supporting assembly. The light sources are arranged on the backboard. The diffuser plate is arranged on the light-emitting side of the light source. The supporting assembly is arranged between the backboard and the diffuser plate. The supporting assembly comprises a supporting base and an elastic support. The supporting base connects with the backboard, one end of the elastic support is connected with the supporting base, another end of the elastic support supports the diffuser plate. The elastic support defines on a plurality of dimming grooves, the plurality of dimming grooves reflects at least a part of light emitted by the light source to the diffusion plate.

18 Claims, 6 Drawing Sheets

BACKLIGHT ASSEMBLY AND DISPLAY DEVICE

FIELD

The present disclosure relates to field of display screen technology, particularly to a backlight assembly, and a display device.

BACKGROUND

With the development of optoelectronic technology, a variety of electronic devices have been used daily. Most of the electronic devices are provided with liquid crystal display panels (LCD panels).

A backlight assembly is one of key components of the LCD panel. The backlight assembly includes a light source, an optical diaphragm, and a supporting column. The optical diaphragm is arranged on the light emitting side of the light source. The supporting column supports the optical diaphragm to avoid the bending deformation of the optical diaphragm due to its own gravity or external force.

The existing supporting column can easily damage the optical diaphragm, and the wrong installation position of the supporting column causes uneven brightness distribution of the light source, the existence of shadows, and the poor image display effect.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
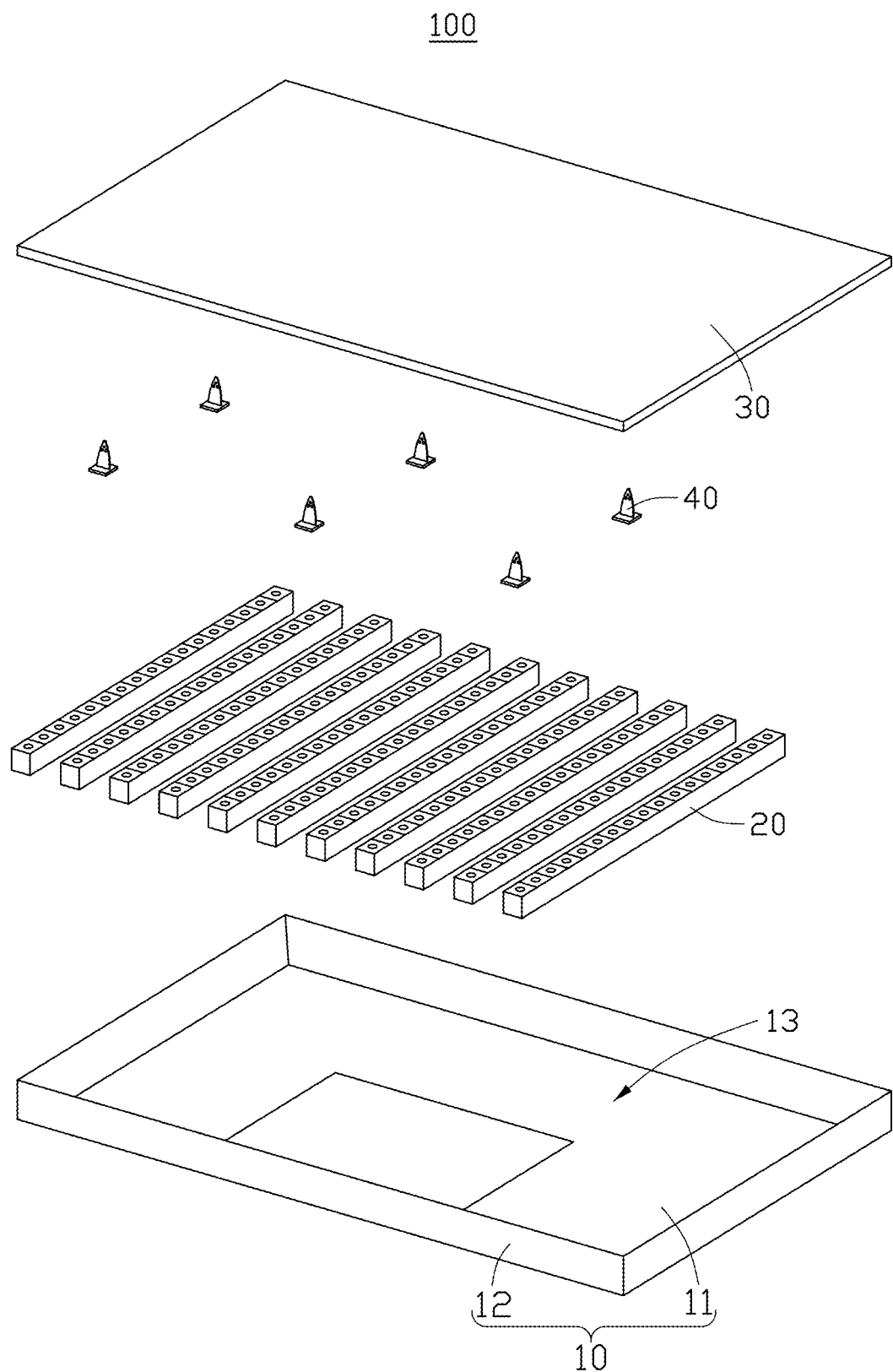
FIG. 1 illustrates a schematic view of a backlight assembly in an embodiment of the present disclosure.

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein comprises any and all combinations of one or more of associated listed items.

Some embodiments of the present application are described in detail. In the case of no conflict, the following embodiments and the features in the embodiments can be combined with each other.

Referring to FIG. 1, FIG. 2, FIG. 3, FIG. 4, FIG. 5A, and FIG. 5B, one embodiment of the present application discloses a backlight assembly 100. The backlight assembly 100 includes a backboard 10, one or more light sources 20, a diffuser plate 30 and one or more supporting assembly 40. The backboard 10 provides with one or more light sources 20. The diffuser plate 30 is arranged on a light-emitting side of the light source 20. One or more supporting assembly 40 is arranged between the backboard 10 and the diffuser plate 30. Each of the one or more supporting assembly 40 includes a supporting base 41 and an elastic support 42. The elastic support 42 is positioned at a top side of the supporting base 41. In one embodiment, the supporting base 41 and the elastic support 42 are connected in one piece. The supporting base 41 connects with the backboard 10. One end of the elastic support 42 is connected with the supporting base 41, another end of the elastic support 42 supports the diffuser plate 30. The elastic support 42 defines a plurality of dimming grooves 43. The plurality of dimming grooves 43 reflects at least a part of the light emitted by the light source 20 to the diffusion plate 30. In one embodiment, when the diffuser plate 30 is not subjected to an external force, the diffuser plate 30 is spaced from the elastic support 42. In other embodiments, the diffuser plate 30 and the elastic support 42 can be arranged adjacently. The elastic support 42 can support part of a gravity of the diffuser plate 30.

The diffuser plate 30 and other optical processing elements are arranged on the light-emitting side of the light source 20. Therefore, the light emitted by the light source 20 is processed by the diffuser plate 30 and other optical processing elements to an external display screen, and the light of a display screen is soft and uniform.

In one embodiment, the supporting assembly 40 is arranged between the backboard 10 and the diffuser plate 30. The elastic support 42 defines the plurality of dimming grooves 43. On the one hand, the elastic support 42 can elastically support the diffuser plate 30 and other optical processing elements to avoid a damage of the diffuser plate 30 and affecting a light quality. On the other hand, the plurality of dimming grooves 43 can reflect at least a part of the light of the light source 20 to avoid a shadow phenomenon caused by the supporting assembly 40.

In one embodiment, the backboard 10 includes a baseboard 11 and a plurality of side plates 12. Four side plates 12 are connected at the four sides of the baseboard 11. The baseboard 11 is surrounded by four side plates 12 to form an accommodation space 13. The baseboard 11 is a square sheet. The light source 20 is arranged in the accommodation space 13, the light source 20 connects to the baseboard 11. Multiple light sources 20 are arranged at intervals in the accommodation space. The number of supporting assemblies 40 is multiple, any of the supporting assemblies 40 is arranged in a middle position between two light sources 20 to support the diffuser plate 30. When the diffuser plate 30 is sunken in a direction of the supporting component 40 by the external force, multiple dimming grooves 43 can reconcile the light emitted by the light sources 20 on both sides of the supporting component 40 to avoid uneven brightness of an external display device caused by the diffuser plate 30.

Figure 2:
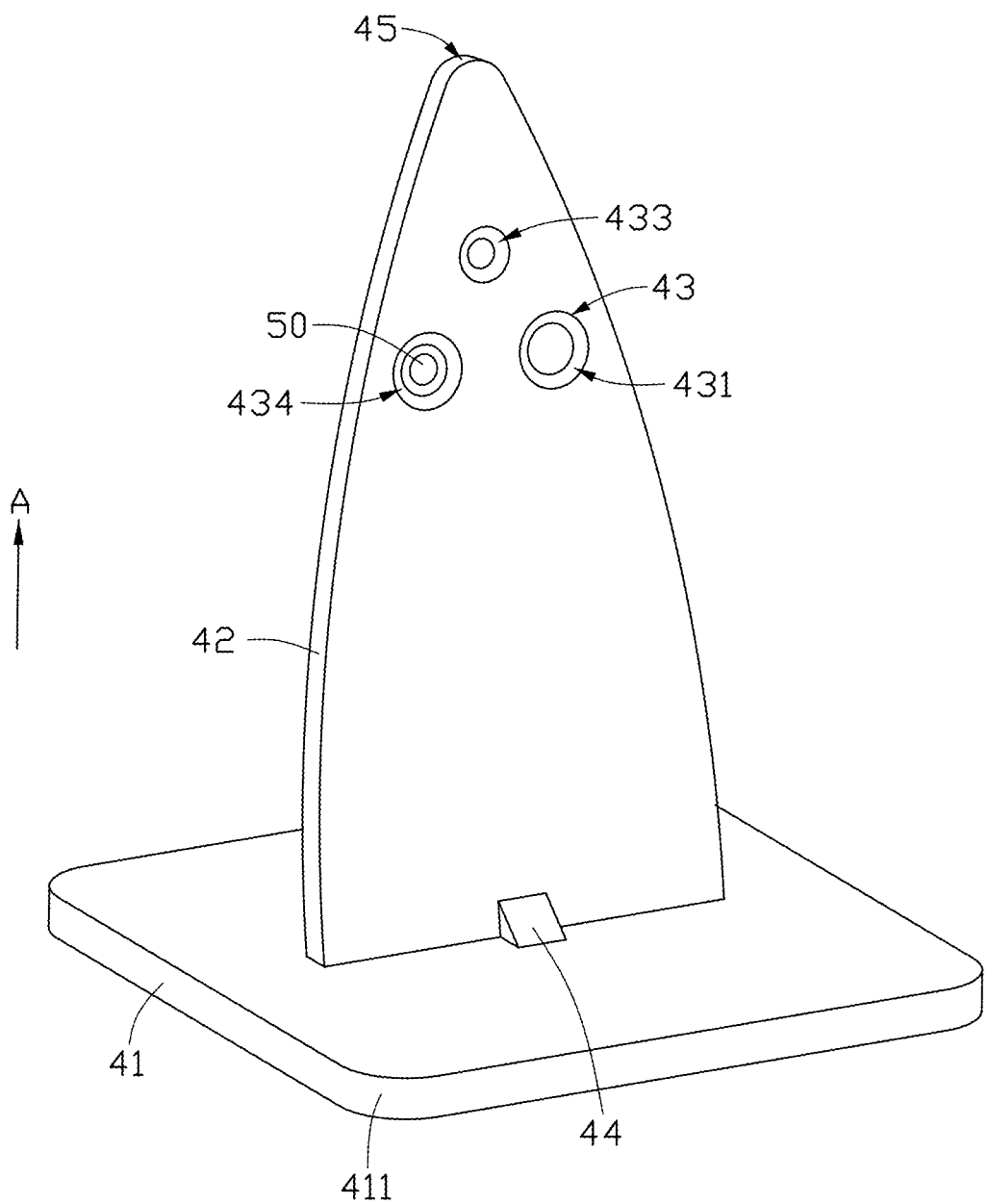
FIG. 2 illustrates a schematic view of a supporting assembly in FIG. 1.
Figure 3:
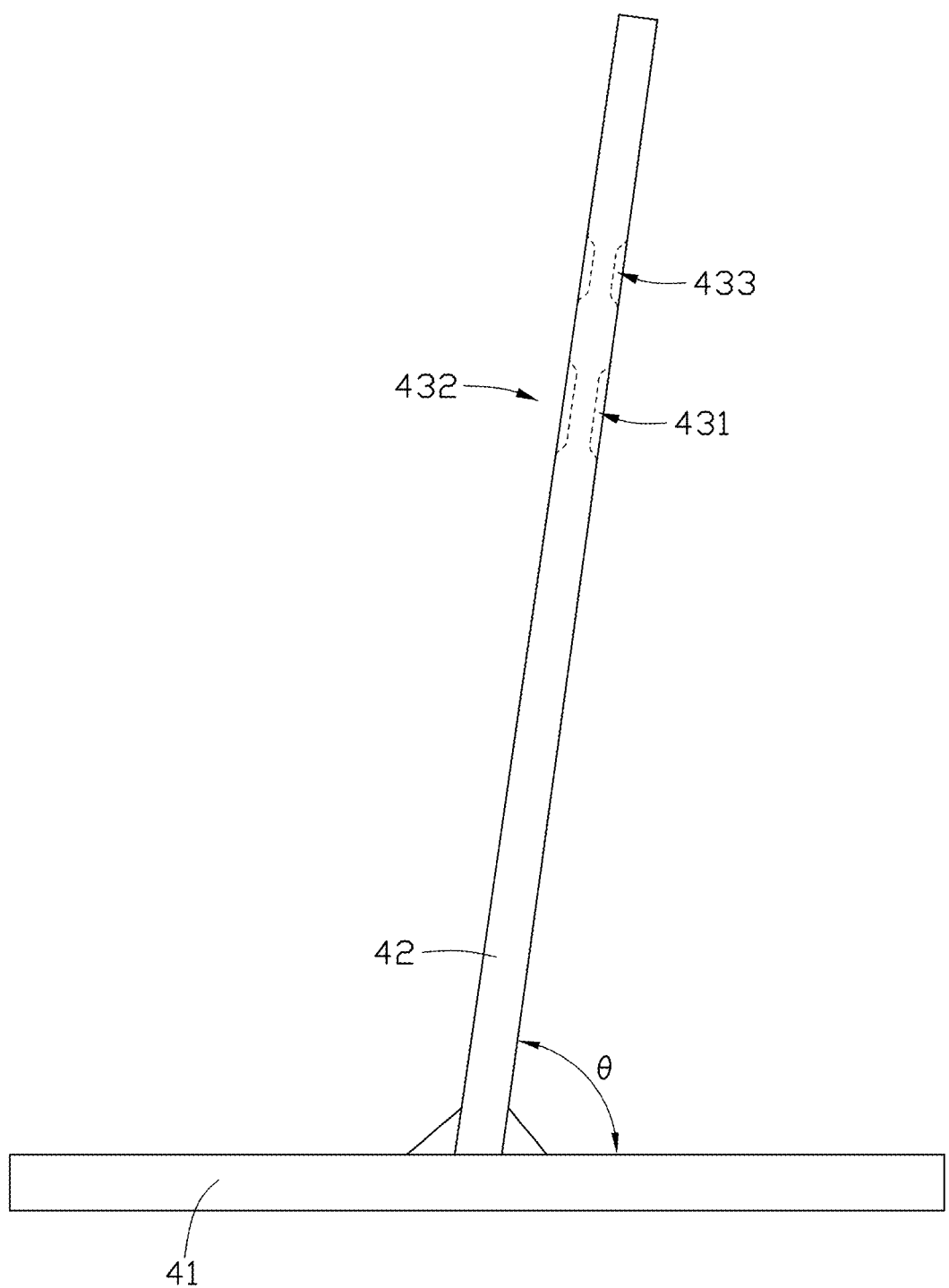
FIG. 3 illustrates a side view of the supporting assembly in FIG. 1.

Referring to FIG. 2 and FIG. 3, the plurality of dimming grooves 43 includes a first dimming groove 431 and a second dimming groove 432. The first dimming groove 431 is arranged on one side of the elastic support 42, and the second dimming groove 432 is arranged on another side of the elastic support 42. The first dimming groove 431 and the second dimming groove 432 have a same shape. The light emitted on both sides of the elastic support 42 can be reflected or refracted by the first dimming groove 431 and the second dimming groove 432. Therefore, a uniformity of the brightness of the external display device is ensured.

In other embodiments, the plurality of dimming grooves 43 includes a third dimming groove 433. The first dimming groove 431 and the third dimming groove 433 are arranged on a same side of the elastic support 42. A distance between the third dimming groove 433 and the supporting base 42 is larger than a distance between the first dimming groove 431 and the supporting base 42. A diameter of the third dimming groove 433 is smaller than a diameter of the first dimming groove 431. The lighter the elastic support 42 receives, the closer the elastic support 42 is to the supporting base 41. The diameters of the dimming grooves 43 on the same side of the elastic support 42 is gradually reduced in a direction from supporting base 41 to the elastic support 42. Therefore, when the elastic support 42 is bent by a gravity or external force of the diffuser plate 30, the light can be reflected to the diffuser plate 30 by the dimming grooves 43 defined at different positions on the elastic support 42. The third dimming groove 433 and the second dimming groove 432 are arranged on the same side of the elastic support 42. Two third dimming grooves 433 are arranged on opposite sides of the elastic support 42, and a distance between one third dimming groove 433 and the supporting base 41 is equal to a distance between the other third dimming groove 433 and the supporting base 41.

Referring to FIG. 2, the plurality of dimming grooves 43 includes a fourth dimming groove 434. The first dimming groove 431 and the fourth dimming groove 434 are arranged on the same side of the elastic support 42. A first distance is between the fourth dimming groove 434 and the supporting base 41. A second distance is between the first dimming groove 431 and the supporting base 41. the first distance is equal to the second distance. The second dimming groove 432 and the fourth dimming groove 434 have the same shape. In other embodiments, the first distance is greater than or less than the second distance, an absolute difference between the first distance and the second distance is in a range between 0 mm~2 mm.

Figure 4:
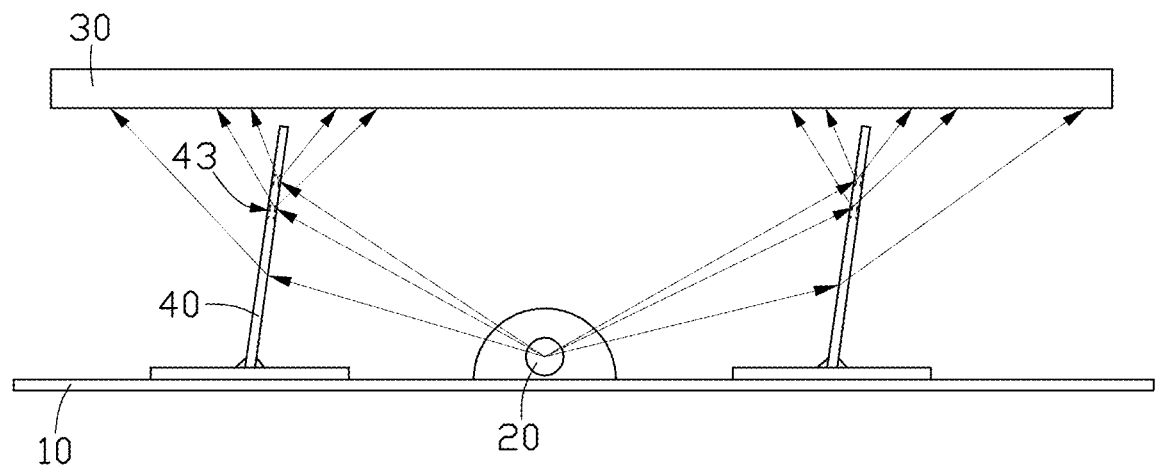
FIG. 4 illustrates an optical path diagram of a light emitted by a light source through the supporting assembly in an embodiment of the present disclosure.

In one embodiment, referring to FIG. 4, the elastic support 42 defines the first dimming groove 431, the second dimming groove 432, the third dimming groove 433, and the fourth dimming groove 434. The first dimming groove 431 and the second dimming groove 432 are arranged on both sides of the elastic support 42. The first dimming groove 431 and the second dimming groove 432 have the same shape. The second dimming groove 432 and the fourth dimming groove 434 have the same shape. The diameter of the third dimming groove 433 is smaller than the diameter of the first dimming slot groove 431. Therefore, reflecting areas of different dimming grooves 43 can be matched with the light intensity at different heights of the elastic support 42. The shape of the dimming grooves 43 is circular, the light reflected or refracted by the dimming grooves 43 is softer. In other embodiments, the shape of the dimming grooves 43 can also be other shapes, such as polygons.

Figure 5A:
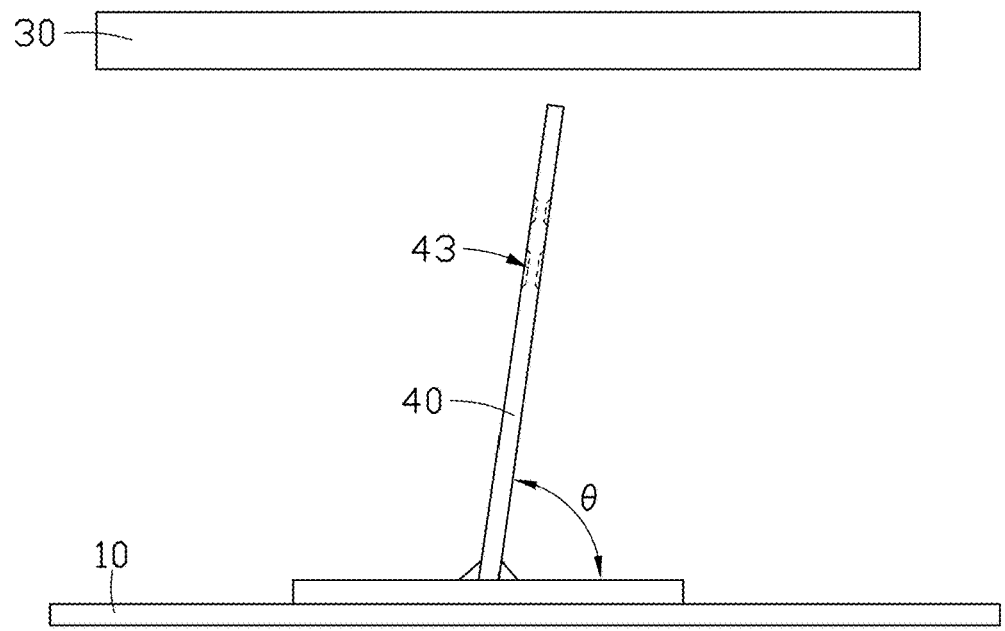
FIG. 5A illustrates a schematic view of the supporting assembly in FIG. 1.
Figure 5B:
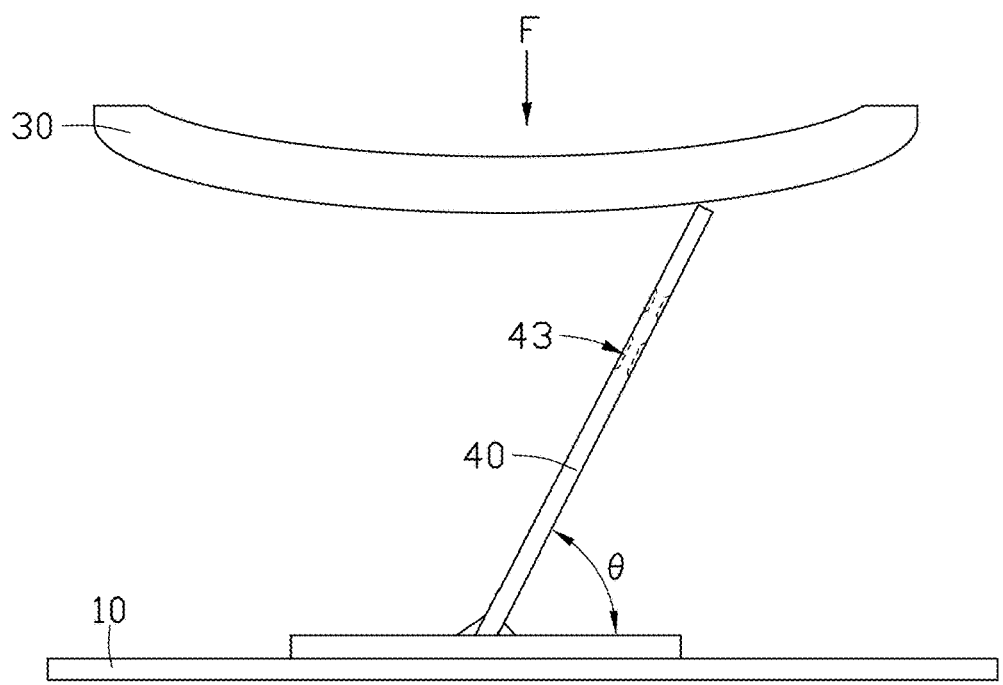
FIG. 5B illustrates a schematic view of the supporting assembly under stress in FIG. 1.

Referring to FIG. 3, in one embodiment, a first angle $\theta$ is defined between the elastic support 42 and the supporting base 43, the first angle $\theta$ is an acute angle. The first angle $\theta$ is in a range between 78° ~ 82°. Referring to FIG. 5A and FIG. 5B, when the diffuser plate 30 is not subjected to external force, the diffuser plate 30 is spaced from the supporting assembly 40, the supporting assembly 40 is not subjected to external force, the first angle $\theta$ is a maximum angle between the elastic support 42 and the support base 41. when the diffuser plate 30 is subjected to external force, a middle of the diffuser plate 30 bends in the direction close to the support assembly 40, a part of the gravity of the diffuser plate 30 and external force are pressured to the support assembly 40, the first angle $\theta$ becomes smaller. The first angle $\theta$ is an acute angle. In the one hand, the support assembly 40 can support the diffuser plate 30, the diffuser plate 30 is arranged to the backboard 10 at an interval, most of the light emitted by the light source 20 can be diffused by the diffuser plate 30. On the other hand, when the elastic support 42 is subjected to the gravity of the diffuser plate 30 and external force, the elastic support 42 can be tilted, the first angle $\theta$ becomes smaller to avoid damaging the diffuser plate 30.

The elastic support 42 and the supporting base 41 are both made of transparent materials, and a reflector 50 can be arranged in any of the dimming grooves 43. The reflector 50 reflects the light emitted by the light source 20. Therefore, the light emitted by the light source 20 can be reflected by the elastic support 42 to the diffuser plate 30. A width of the elastic support 42 decreases gradually along a direction A, and the direction A is from one end of the elastic support 42 connecting the supporting base 41 to away from the supporting base 41. Referring to FIG. 2, a shape of the supporting base 41 is square, a shape of four corners 411 of the supporting base 41 is curved to avoid damaging the light source 20 or other elements. The elastic support 42 is a semi-elliptical sheet, the elastic support 42 is provided with a supporting surface 45. The supporting surface 45 is spaced from the support base 41. The supporting surface 45 is a curved surface, when the elastic support 42 supports the diffusion plate 30, the support surface 45 is in contact with the diffusion plate 30 to prevent the support component 40 from damaging the diffusion plate 30. In other embodiments, the elastic support 42 can also be a semi-elliptical plate, semi-circular plate, or semi-cylindrical plate.

In one embodiment, the supporting assembly 40 further includes two stabilizers 44. Two stabilizers 44 are respectively set on the opposite sides of the elastic support 42. Two stabilizers abut against the supporting base 41 and the elastic support 42. When the elastic support 42 is bent by the gravity or external force of the diffusion plate 30, a stability of the elastic support 42 and the support base 41 can be guaranteed.

Figure 6:
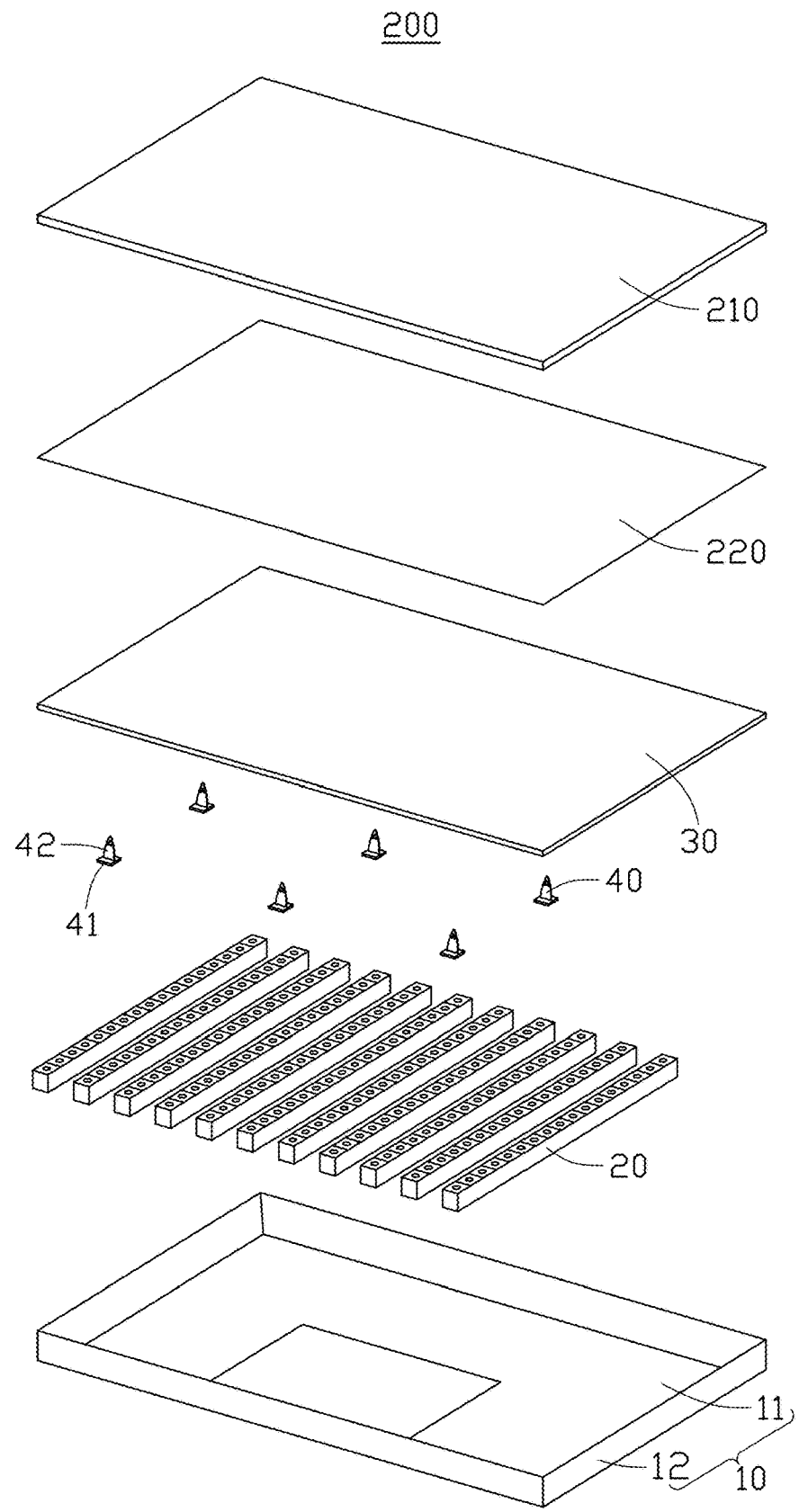
FIG. 6 illustrates a schematic view of a display device in an embodiment of the present disclosure.

Referring to FIG. 6, the embodiment of the present application also discloses a display device 200. The display device 200 includes a display panel 210, a diffuser plate 30, a backboard 10, an optical diaphragm 220, one or more supporting assembly 40, and multiple of light sources 20. The display panel 210 is arranged on a side of the diffuser plate 30 away from the backboard 10. The optical diaphragm 220 is arranged between the display panel 210 and the diffuser plate 30. One or more light sources 20 is provided on the backboard 10, the diffuser plate 30 is arranged on the light-emitting side of the light source 20. The plurality of supporting assembly 40 is arranged between the backboard 10 and the diffuser plate 30. The supporting assembly 40 includes a supporting base 41 and an elastic support 42. The supporting base 41 connects with the backboard 10, one end of the elastic support 42 is connected with the supporting base 41, the other end of the elastic support 42 supports the diffuser plate 30. The elastic support 42 defines on a plurality of dimming grooves 43, the dimming grooves 43 reflect part of the light emitted by the light source 20 to the diffusion plate 30, the optical diaphragm 220, and the display panel 210.

On the one hand, in the backlight assembly 100, the plurality of dimming grooves 43 are arranged on both sides of the elastic support 42, the diameters of multiple dimming grooves 43 on the same side of the elastic support 42 are gradually decreased along the direction A. The light emitted by the light source 20 to different areas of the elastic support 42 can be reflected or refracted by the dimming grooves 43 to the diffuser 30 plate. In order to make the light after the dimming groove 43 to be gentler to an external equipment, the dimming grooves 43 are set to a circle. On the other hand, the elastic support 42 is set at an acute angle with the supporting base 41, when the elastic support 42 is pressed, the elastic support 42 supports the diffuser plate 30. The supporting surface 45 can avoid damaging to the diffuser plate 30. The elastic support 42 is elastic, which enhances the bending resistance of the supporting assembly 40. The elastic support 42 can also reduce the number of installations of the supporting assembly 40 and reduce a production cost.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A backlight assembly comprising:
   a backboard;
   one or more light sources arranged on the backboard;
   a diffuser plate arranged on a light-emitting side of the light source; and
   one or more supporting assembly arranged between the backboard and the diffuser plate, each of the one or more supporting assembly comprising a supporting base and an elastic support, wherein the elastic support is positioned at a top side of the supporting base, the supporting base connects with the backboard, one end of the elastic support is connected with the supporting base, another end of the elastic support supports the diffuser plate, the elastic support defines a plurality of dimming grooves, each of the plurality of dimming grooves provides a groove bottom, the groove bottom reflects at least a part of light emitted by the light source to the diffusion plate.

2. The backlight assembly as claimed in claim 1, wherein the plurality of dimming grooves comprises a first dimming groove and a second dimming groove, the first dimming groove is arranged on one side of the elastic support, and the second dimming groove is arranged on another side of the elastic support.

3. The backlight assembly as claimed in claim 2, wherein the first dimming groove and the second dimming groove have a same shape.

4. The backlight assembly as claimed in claim 2, wherein the plurality of dimming grooves further comprises a third dimming groove, the first dimming groove and the third dimming groove are arranged on a same side of the elastic support, a distance between the third dimming groove and the supporting base is larger than a distance between the first dimming groove and the supporting base, a diameter of the third dimming groove is smaller than a diameter of the first dimming groove.

5. The backlight assembly as claimed in claim 2, wherein the plurality of dimming grooves further comprises a fourth dimming groove, the first dimming groove and the fourth dimming groove are arranged on a same side of the elastic support, a distance between the fourth dimming groove and the supporting base is equal to a distance between the first dimming groove and the supporting base, the fourth dimming groove and the first dimming groove have a same shape.

6. The backlight assembly as claimed in claim 1, wherein a first angle is defined between the elastic support and the supporting base, the first angle is an acute angle.

7. The backlight assembly as claimed in claim 6, wherein the first angle is in a range between 78°~82°.

8. The backlight assembly as claimed in claim 1, wherein the plurality of dimming grooves is provided with a reflector, the reflector reflects light emitted by the light source.

9. The backlight assembly as claimed in claim 1, wherein the supporting assembly further comprises a stabilizer, the stabilizer abuts against the supporting base and the elastic support.

10. The backlight assembly as claimed in claim 1 comprising multiple of the light sources, wherein the backboard comprises a baseboard and a plurality of side plates, the baseboard is surrounded by the plurality of side plates to form an accommodation space, the light source is arranged in the accommodation space, each of the one or more supporting assemblies is arranged in a middle position between adjacent two of the one or more light sources.

11. The backlight assembly as claimed in claim 1, wherein a width of the elastic support decreases along a direction, and the direction is from one end of the elastic support that connects the supporting base to away from the supporting base.

12. The backlight assembly as claimed in claim 1, wherein a shape of the supporting base is square, a shape of four corners of the supporting base is curved.

13. The backlight assembly as claimed in claim 1, wherein the elastic support is provided with a supporting surface, the supporting surface is spaced from the supporting base, a shape of the supporting surface is fan-shaped or semi-circular shaped.

14. A display device comprising:
a display panel;
a diffuser plate;
a backboard, the display panel being arranged on a side of the diffuser plate away from the backboard;
an optical diaphragm arranged between the display panel and the diffuser plate;
one or more light sources provided on the backboard, the diffuser plate being arranged on the light-emitting side of the light source; and
one or more supporting assembly arranged between the backboard and the diffuser plate, each of the one or more supporting assembly comprising a supporting base and an elastic support, wherein the supporting base connects with the backboard, one end of the elastic support is connected with the supporting base, another end of the elastic support supports the diffuser plate, the elastic support defines a plurality of dimming grooves, the plurality of dimming grooves comprises a first dimming groove, a second dimming groove and a third dimming groove, the first dimming groove is arranged on one side of the elastic support, and the second dimming groove is arranged on another side of the elastic support, the first dimming groove and the third dimming groove are arranged on a same side of the elastic support, a distance between the third dimming groove and the supporting base is larger than a distance between the first dimming groove and the supporting base, a diameter of the third dimming groove is smaller than a diameter of the first dimming groove, the plurality of dimming grooves reflects at least a part of light emitted by the light source to the diffusion plate, the optical diaphragm, and the display panel.

15. The display device as claimed in claim 14, wherein the first dimming groove and the second dimming groove have a same shape.

16. The display device as claimed in claim 14, wherein the plurality of dimming grooves comprises a fourth dimming groove, the first dimming groove and the fourth dimming groove are arranged on a side of the elastic support, a distance between the fourth dimming groove and the supporting base is equal to a distance between the first dimming groove and the supporting base, the fourth dimming groove and the first dimming groove have a same shape.

17. The display device as claimed in claim 14, wherein a first angle is defined between the elastic support and the supporting base, the first angle is an acute angle.

18. The display device as claimed in claim 17, wherein the first angle is in a range between 78°~82°.

* * * * *